March 22, 1927.
H. E. HODGSON
1,621,882
STEERING WHEEL REMINDER
Filed Feb. 2, 1924
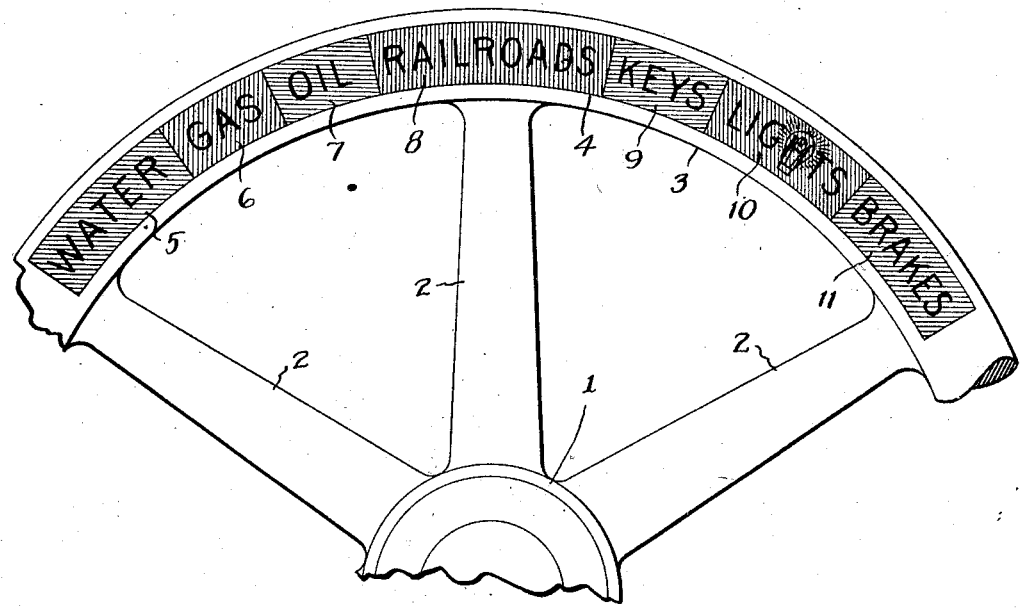
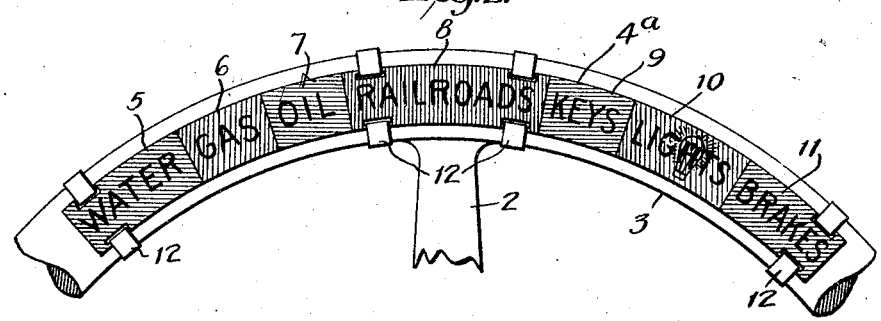
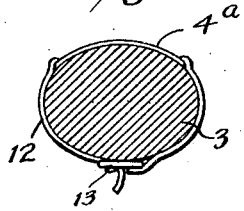
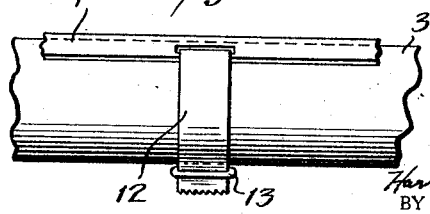
INVENTOR
Harriette E. Hodgson
BY
ATTORNEY Patented Mar. 22, 1927.

1,621,882

UNITED STATES PATENT OFFICE.

HARRIETTE E. HODGSON, OF NEW YORK, N. Y.

STEERING-WHEEL REMINDER.

Application filed February 2, 1924. Serial No. 690,136.

The object of this invention is by a very simple means to obviate the difficulties, inconveniences and dangers so often encountered or incurred by drivers of automobiles through failure to have in mind the numerous things that have to be attended to in the use of the car. A large proportion of automobilists have these lapses at one time or another, and the difficulties of an absent-minded driver are constantly vexatious and not infrequently expensive or disastrous in the extreme.

The experience of finding oneself without gasoline remote from a source of supply is a common one. The cooling system must also be refilled at intervals, or the engine will burn out, and through lack of oil bearings will be destroyed and the machine put out of commission. Keys for locking the car are frequently forgotten, or their use omitted, with resulting loss. The battery for the lights has to be supplied with distilled water at intervals or it will become ruined, and the lights should be turned on at the times and under the conditions prescribed by law. Many accidents are due to failure of the brakes, which should be inspected and adjusted at regular intervals.

At railroad crossings a terrific and ever-mounting loss of life takes place, which makes it of the utmost importance to impress upon drivers the necessity for caution in approaching such spots.

My purpose is to set before the driver a forceful reminder of matters of this nature, in a spot where it will be most noticeable and where it can and will be observed without any distraction of attention from the business of driving, and to secure this important benefit at very slight expense.

In the accompanying drawing forming part hereof:

Fig. 1 is a partial plan view of a steering wheel provided with the invention by having it painted thereon;

Fig. 2 is a similar view illustrating a form in which the reminder is a strip which is applied as an attachment by strapping or otherwise to the rim of the wheel;

Fig. 3 is a cross-section of Fig. 2; and

Fig. 4 is a fragmentary elevation illustrating the same form.

An automobile steering-wheel is represented in partial view, 1 being the hub of the wheel, 2 some of the spokes and 3 the rim.

The upper quadrant, more or less, of the rim, that is to say the segment at the far side of the steering-column from the driver, is selected, and to the top of this portion the reminder is applied.

As shown in Fig. 1 the reminder 4 consists of an arc of painted sections applied directly to the rim, or to any covering with which the rim may be provided. These sections or blocks are marked 5, 6, 7, 8, 9, 10, 11, and they bear the words Water, Gas, Oil, Railroads, Keys, Lights, Brakes, prominently painted on them. Other sections might be added, and some might even be omitted, and of course synonymous words may be selected, but the plan is, generally, to cover the range of duties that the driver should perform or have performed in the regular care and operation of the car. The use of colors is advantageous both to cause the sign to be as noticeable as possible and so that it may be ornamental. If the sections are alternately of a good red and a good blue color in the ground, with red letters on the blue ground and blue letters on the red, the effect will be excellent, but it will be understood that I do not limit myself to the precise colors or the form or arrangement of lettering or to the particular ornamental plan, since these may be varied according to choice.

Symbols may also be employed with advantage. Thus, on the section marked Lights, there is shown the representation of an electric light.

The section marked Railroads I desire to have especially prominent, and for that reason I have shown it considerably larger than the other sections and placed in the middle of the arch, where it is directly under the eye of the driver. This section should be of a bold red, and flanked on either side by blue or other colored sections it will serve as an insistent warning to be on the watch for railroads and to observe due care in crossing them.

The plan shown in Figs. 2 to 4 is similar except that the reminder is painted or printed upon a strip 4ª of metal, canvas, rubber, leather, celluloid, or any suitable flexible material, which is put on the rim of the wheel in the same position, as by means of straps and buckles 12, 13, or by other attaching means, or the attachment might be made to spring onto the wheel.

What I claim as new and desire to secure by Letters Patent is:

An automobile requirement reminder to be secured to the upper surface of the forward arc of the steering wheel, comprising a series of independent and distinctly and different colored reminder sections arranged in uninterrupted continuation, with the contrastingly-colored sections arranged in adjacent relation, each section being permanently marked to indicate to the driver certain acts to be performed by him in connection with the automobile, the width of the sections approximating the diameter of the steering wheel.

HARRIETTE E. HODGSON.